Dec. 18, 1951 W. G. KÖGEL Re. 23,442

ABSORPTION REFRIGERATION

Original Filed Dec. 15, 1944 2 SHEETS—SHEET 1

INVENTOR.
Wilhelm Georg Kögel
BY
Edmund A. Zeranka
his ATTORNEY

ABSORPTION REFRIGERATION

Original Filed Dec. 15, 1944 2 SHEETS—SHEET 2

INVENTOR.
Wilhelm Georg Kögel
BY
Edmund A. Zernander
his ATTORNEY

Reissued Dec. 18, 1951

Re. 23,442

UNITED STATES PATENT OFFICE 23,442

ABSORPTION REFRIGERATION

Wilhelm Georg Kögel, Stockholm, Sweden, assignor to Aktiebolaget Elektrolux, Stockholm, Sweden, a corporation of Sweden Original No. 2,538,010, dated January 16, 1951, Serial No. 568,269, December 15, 1944. Application for reissue October 20, 1951, Serial No. 252,229. In Sweden March 3, 1944

13 Claims. (Cl. 62—119.5)

Matter enclosed in heavy brackets [ ] appears in the original patent but forms no part of this reissue specification; matter printed in italics indicates the additions made by reissue.

This invention relates to refrigeration and more particularly to absorption refrigeration apparatus of the pressure equalizing type employing an inert gas or auxiliary pressure equalizing agent.

It is an object of the invention to provide an improvement to obtain better liquid circulation in heat operated absorption refrigeration apparatus of this type having a vapor-liquid lift tube or pump which receives absorption solution from an absorber through a passage of a liquid heat exchanger, the inlet of the lift tube or pump being at a lower level than the outlet of the liquid heat exchanger passage from which solution flows to the lift tube or pump.

Figure 1:
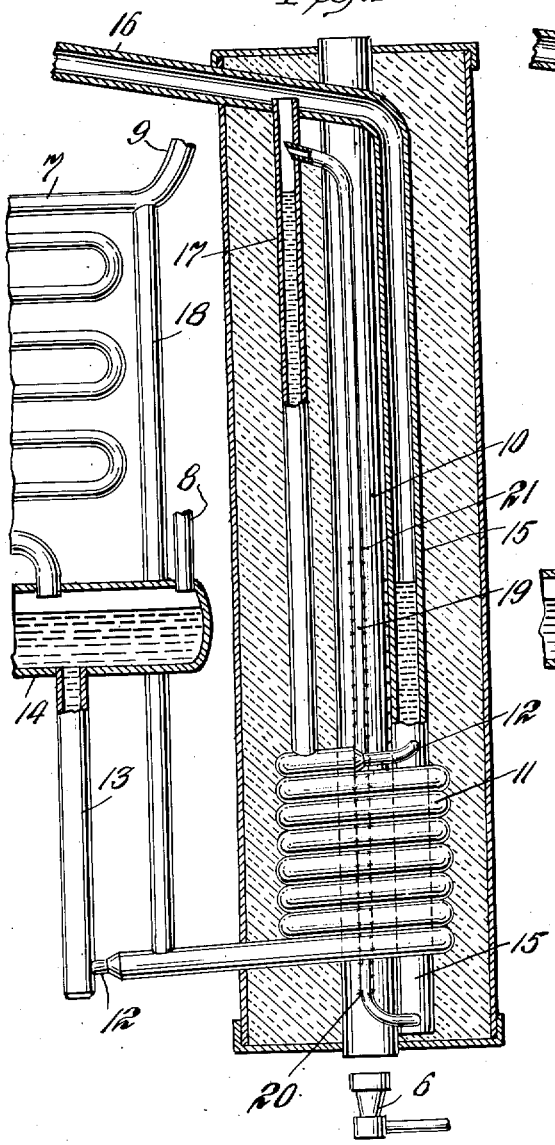
Figure 2:
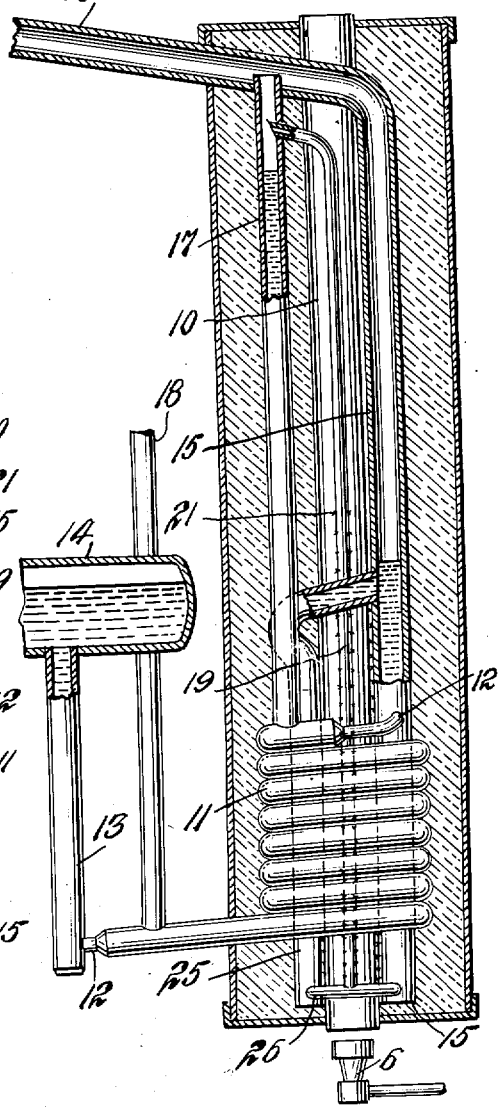
Figure 3:
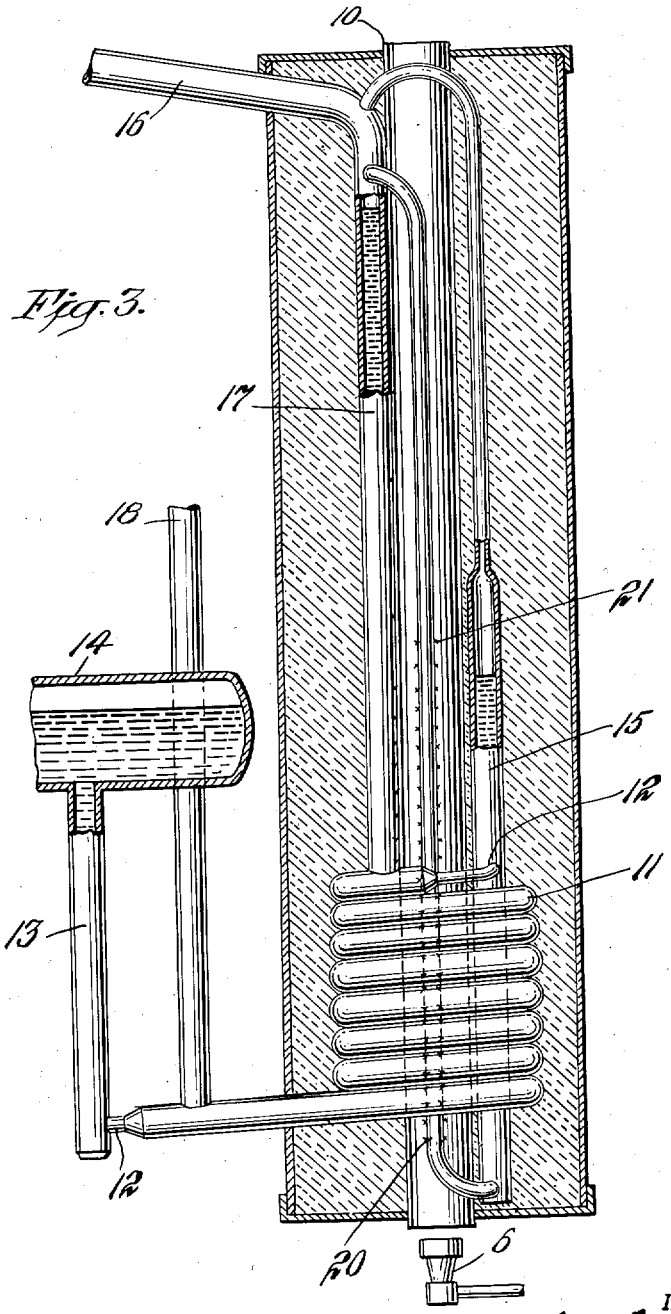

The above and other objects and advantages of the invention will be better understood from the following description taken in connection with the accompanying drawing forming a part of the specification, and of which:

Fig. 1 is a fragmentary view of absorption refrigeration apparatus embodying the invention; and Figs. 2 and 3 are fragmentary views of refrigeration apparatus which are similar to Fig. 1 illustrating further embodiments of the invention.

In Fig. 1, reference numeral 10 designates a tube which serves as a heating tube or flue and in the lower heat input end of which a heat source, such as a burner 6, for example, is positioned. The liquid heat exchanger 11 of the apparatus, which is in the form of a helical coil, is disposed concentrically about the flue 10. At its lower end the inner tube 12 of the exchanger communicates with a conduit 13 which is connected at its upper end to an absorber vessel 14 which is adapted to hold a body of absorbent rich in refrigerant. At its upper end the tube 12 is connected to a vertically disposed conduit 15 which is closed at its lower end. The conduit 15 is heat conductively connected, as by welding, for example, with the flue 10 along a common generatrix. The upper end of conduit 15 communicates with a vapor conduit 16 leading to the condenser of the apparatus, not shown.

The conduit 15 serves as the boiler proper of the apparatus in which the main or principal part of the refrigerant vapor is expelled. The rich solution flows from the absorber vessel 14 through the inner tube or passage 12 of the liquid heat exchanger 11 into the conduit or pipe 15 in which it is heated to the boiling point or temperature to expel vapor therefrom, such solution flowing downward toward the bottom of the pipe or boiler 15 with decreasing concentration of refrigerant. A vapor-liquid lift tube or pump 19 for effecting circulation of liquid is connected at its lower end to the lower end of the boiler 15 and at its upper end to a standpipe 17 which is vertically disposed and connected at its upper end to the vapor conduit 16. Raised solution is introduced into the upper end of the standpipe 17 whose lower end communicates with the outer tube or passage of the liquid heat exchanger 11 through which solution flows into a conduit 18 which, in turn, is connected at its upper end to the air-cooled absorber of the apparatus which may be in the form of a tubular coil 7.

In a well known manner, inert gas rich in refrigerant enters absorber vessel 14 through a conduit 8 and inert gas weak in refrigerant passes from the upper end of absorber 7 through a conduit 9. The lift tube or pump 19 is welded to the flue 10 along a common generatrix from a point 20 up to a point 21. By way of example and without limitation the distance between the points 20 and 21 desirably should not be less than 50 mm. and preferably should exceed 70 mm.

It has already been mentioned that the boiling of refrigerant takes place chiefly in the pipe 15 which serves as the boiler proper. The solution flowing to the bottom of the pipe 15 will therefore be relatively poor in refrigerant and the lift tube or pump 19 accordingly will function and operate at a higher temperature which is dependent upon the lower refrigerant concentration of the solution. When the rate at which refrigerant is expelled from solution in pipe 15 is not too excessive, the lift tube or pump 19 in certain cases may be formed as a coil disposed about the lower end of the flue 10 from which a riser pipe extends upward which is thermally separated from the flue. However, it generally is extremely important to provide the lift tube or pump 19 in the manner illustrated in Fig. 1 which is the preferred manner of practicing the invention. By extending the heat conductive connection between the flue 10 and the pump tube 19 upwardly in a vertical direction to a point which is at a level with or higher than the liquid level in the absorber vessel 14, satisfactory operation of the liquid pump is insured, particularly when the refrigeration apparatus is started following a shut-down period. In such case the size of the reaction head formed by the liquid column in pipe 15 is relatively important.

The raised solution, the refrigerant concentration of which is further decreased by expulsion of refrigerant in the pump 19, is introduced into the standpipe 17 in which further expulsion of refrigerant from solution may take place if desired. In such case the standpipe 17 may be arranged in heat conductive relation with the flue 10. Usually expulsion of refrigerant from solution in the standpipe 17 is unnecessary and not desirable because such expelled vapor will contain a relatively large amount of absorbent vapor. However, in certain cases in which particular utilization of the heat contents of the heating gases passing through the upper parts of the flue is desired, a heat conductive connection may be provided between the standpipe 17 and the flue 10 so that the poor solution will flow downwardly through the standpipe at an unchanged or somewhat increased temperature. In this manner, the heat contents of the flue gases will be utilized by such heat exchange. Owing to the low boiler level there may otherwise ensue difficulties in the rational utilization of the heat contents of the flue gases.

Another embodiment of the invention is diagrammatically shown in Fig. 2 which illustrates a part of the absorption liquid circuit, it being understood that such circuit also includes an absorber 7 and connections 8 and 9 similar to those shown in Fig. 1 and that corresponding parts are referred to by the same reference numerals. In Fig. 2 the suction side of the pump 19 is connected to a tube 26 which in turn is connected to the boiler 15 and also to an auxiliary boiler 25 which comprises a tube heat conductively connected with the flue 10 and having a closed lower end. The upper end of auxiliary boiler 25 communicates with the boiler 15 at a point somewhat below the liquid level in the latter. In certain cases it may be advantageous to omit or limit the heat conductive connection between the auxiliary boiler 25 and the flue 10. With this arrangement the rich solution in the surface layer of the boiler 15 is sucked or drawn through the auxiliary boiler 25 into the pump tube 19 together with poor solution from the main boiler 15.

The pump will therefore operate with a solution having higher concentration of refrigerant than in the embodiment of Fig. 1 and consequently the refrigerant concentration of the vapor passing from the pump 19 will be correspondingly higher. In certain cases it may even be advantageous to connect the pump or lift tube 19 only to the auxiliary boiler 21. In such case, however, special measures should be taken for effecting circulation of the liquid held in the main boiler 15, as by dividing the boiler pipe 15 by a partition into two sections which are in communication with each other at a region below the lower end of the partition and into one of which the conduit 12 is connected.

Where it is desired to feed the pump 19 with solution that is rich in refrigerant, it is possible to practice the invention in a manner which differs from the embodiment of Fig. 1 by limiting or interrupting the heat-conducting contact between the boiler pipe 15 and the flue 10, so that expulsion of refrigerant from solution will take place chiefly in the lift tube or pump 19. Should the development of gas in said pump be of an order unsuitable for normal circulation of liquid, the standpipe 17 may be heat conductively connected with the flue, thus functioning as the boiler proper of the apparatus. In this case the amount of heat transferred from the heat source or heating tube 10 will be distributed between the pump 19 and the tube 17. Such an arrangement of a vapor expulsion unit or boiler system is illustrated in Fig. 3 in which parts like those shown in Figs. 1 and 2 are referred to by the same reference numbers, it being understood that the absorption solution circuit of Fig. 3 also includes an absorber 7 and connections 8 and 9 like those shown in Fig. 1. *As in the previously described embodiments of Figs. 1 and 2, the extreme lower end of the standpipe or conduit 17 is connected to the outer passage of the vertically extending liquid heat exchanger coil 11 at the upper end of such coil.*

The invention is chiefly intended to be applied to domestic refrigerating apparatus which operates continuously and employs an inert gas, such as hydrogen, for example. Further, ammonia may be employed as the refrigerant and water as the absorbent. However, the invention is not to be limited to the specific embodiments which are illustrated and described above. The arrangement of the vapor expulsion unit or boiler system, inclusive of the heat exchanger, may be modified in many respects within the scope of the invention. However, the greatest advantage is offered by the type of boiler illustrated herein because it is possible to establish in a very simple manner suitable conditions for effecting satisfactory heat distribution among the different liquid spaces of the vapor expulsion unit or boiler system, the number of which is at least two and in certain cases may be increased to four or even five by division into vertical sections.

For completely utilizing the advantages of the invention the construction of the boiler is of great importance. To prevent corrosion and for economical reasons, it is desirable to reduce the number of welded seams to a minimum. From a thermal point of view it is advantageous to use tubes which are as narrow as possible. By way of an example and without limitation it may be stated that in the embodiment of Fig. 3 the boiler pipe 15 may be given the same dimension as the pump tube. The pipe 15 and the pump 19 may be formed from the legs of a seamless U-tube in which case the standpipe 17 must obviously be connected heat conductively with the flue, thus functioning as the boiler of the apparatus. If it is not possible to choose the same dimension for the pipe 15 and the pump 19, it is in most cases possible to select a dimension for the pipe 15 which will be between the dimensions of the tubes 17 and 19. In a similar manner the tube 17 of Fig. 1 may be selected so that its cross-sectional area will be between that of tubes 19 and 15.

In view of the foregoing it will now be understood that the lift tube or pump 19 extends downwardly from the upper end of liquid heat exchanger 11. The pump 19 does not form a direct upward extension or continuation of the inner pipe 12 of the liquid heat exchanger but instead is connected to the lower end of the pipe or conduit 15. Such an arrangement of the parts of the vapor expulsion unit or boiler system is of distinct advantage by reason of the low position at which the heat source is placed in the lower heat input end of the heating tube or flue 10. If the pump or lift tube 19 extended upwardly from the region the inner pipe 12 of the liquid heat exchanger is connected to the boiler pipe 15, the liquid reaction head under which solution would be raised would be relatively small. Also, the heat supply to the pump pipe 19 in such an arrangement would not be effected under the most satisfactory conditions.

In the several embodiments of the invention which have been shown and described, the heating tube 10 and vertical conduits 15 and 17 disposed alongside the heating tube constitute a vapor expulsion unit in which one of the vertical conduits is heat conductively connected to the heating tube and in thermal relation therewith. Solution flows in an unbroken stream from the outlet of the absorber vessel 14 to the lower end of the pump 19 in a path of flow which includes conduit 13, inner pipe 12 of the liquid heat exchanger and conduit 15. Thus, the liquid column in conduit 15 freely communicates with the outlet of the absorber by an unbroken liquid body, and liquid flows entirely by gravity from the outlet of vessel 14 to a region of conduit 15 removed from the lower end thereof. The liquid surface level in the conduit 15 is above the highest point of the liquid heat exchanger and approximately at the same level as the liquid body in the absorber vessel 14. Also, the liquid surface level in the conduit 15 is above the region solution is conducted thereto through the inner pipe 12 of the liquid heat exchanger.

It will be seen that both of the heat exchanger pipes of helical form provide ascending paths of flow for any vapor in the heat exchanger passages which is always vented into the conduits 15 and 17, respectively. Solution passing from the outlet end of absorber vessel 14 is conducted through the inner pipe 12 of heat exchanger 11 only in an ascending path of flow. Further, the lift tube or pump pipe 19 is thermally connected to the heating tube 10 in a zone extending between the liquid surface level in conduit 15 and the lowest part of the heat exchanger 11 so that vapor will be expelled from solution in the lift pipe and liquid will be raised therein by vapor lift action under the influence of the reaction head formed by the liquid column in the conduit 15.

In all of the embodiments shown the lift tube 19 and conduits 15 and 17 in their entirety are disposed outside the heating tube or flue 10. In the embodiments of Figs. 1 and 2 the conduit 17 is thermally separated or spaced from the heating tube 10 while in Fig. 3 the conduit 15 is thermally separated or spaced from the heating tube or flue. In all of the embodiments shown and described the lower heat input end of the heating tube or flue 10 extends downwardly below the lowest point of the liquid heat exchanger 11, and the highest point of the liquid heat exchanger is located at a region intermediate the upper and lower ends of the flue. In all of the embodiments the liquid heat exchanger 11, which is in the form of a helical coil, is disposed about the heating tube or flue [11] *10* and the conduit 15.

While particular embodiments of the invention have been shown and described, such variations and modifications are contemplated as fall within the true spirit and scope of the invention, as pointed out in the following claims. [However, the provision of the liquid pocket in conduit 17 below the connection of the outer passage of the liquid heat exchanger 11 thereto, which is shown in Fig. 3, is being claimed in copending application Serial No. 673,669, filed May 31, 1946.]

I claim:

1. In an absorption refrigeration system of the inert gas type including an absorber, a liquid heat exchanger having a plurality of passages, a vapor expulsion unit comprising an upright heating tube, first and second upright conduits alongside of said heating tube and at least one of which is in heat conductive relation therewith, the aforesaid parts being so connected that solution flows in an unbroken stream from the outlet of said absorber through a passage of said heat exchanger and first conduit into the lower end of said lift pipe and [form] *forms* a liquid column in said first conduit having a liquid surface level which is above the highest point of said heat exchanger, and solution entering from said lift pipe forms a liquid column in said second conduit from which solution flows through another passage of said heat exchanger to the inlet of said absorber, said heat exchanger being so arranged and connected in the system that vapor in any part of the passages thereof is always vented into said conduits, and said lift pipe having a part thermally connected to said heating tube in a zone extending between the liquid surface level in said first conduit and the lowest part of said heat exchanger to cause expulsion of vapor from solution in said pipe and raise liquid therein by vapor lift action under the influence of a reaction head formed by the liquid column in said first conduit.

2. In an absorption refrigeration system of the inert gas type, a [circnit] *circuit* for absorption solution including an absorber, a liquid heat exchanger and a compact vapor expulsion unit comprising a vertically extending flue, first and second conduits substantially parallel to said flue and a lift pipe communicating with the lower part of said first conduit and upper part of said second conduit for raising liquid therein by vapor lift action, both of said conduits and said lift [pipes] *pipe* in their entirety being disposed outside said flue, said first conduit being in thermal relation with the exterior surface of said heating flue and said second conduit being thermally separated therefrom, the aforementioned parts being so constructed and connected in said circuit that solution flows in an unbroken stream from the outlet of said absorber through said heat exchanger and first conduit into the lower end of said lift pipe and forms a liquid column in said first conduit having a liquid surface level above the highest point of said heat exchanger, and solution entering from said lift pipe forms a liquid column in said second conduit and from which solution flows through said heat exchanger to the inlet of said absorber, and said lift pipe having a zone adjacent the lower end thereof thermally connected to the exterior surface of said heating flue to cause expulsion of vapor from solution in such zone and raise liquid in said pipe by vapor lift action under the influence of a reaction head formed by the liquid column in said first conduit.

3. In an absorption refrigeration system of the inert gas type including a refrigerant vapor supply line, an upright heating flue having a lower heat input end, a circuit for circulation of absorption solution including an absorber, a vertically extending liquid heat exchanger having its highest point intermediate the ends of said flue, and a vapor expulsion unit comprising first and second upright conduits, a first connection including said heat exchanger for conducting solution from said absorber to said first conduit at a region removed from the lower end thereof, the solution flowing from said absorber through said first connection having only an ascending path of flow in said heat exchanger, a second connection including said heat exchanger for conducting solution from said second conduit to said absorber, a lift pipe which is connected at its lower and upper ends to said first and second conduits, respectively, one of said conduits being in thermal relation with said heating flue, conduit means for conducting vapor from the upper ends of said conduits to said vapor supply line, said first connection being so formed that said first conduit contains a liquid column whose surface level is above the region solution is conducted thereto, and also above the highest point of said heat exchanger, and said lift pipe having a part in thermal relation with said flue along a zone extending downwardly below the highest point of said heat exchanger to cause expulsion of vapor from solution in said pipe and raise liquid therein by vapor lift action under the influence of a reaction head formed by the liquid column in said first conduit.

4. In an absorption refrigerating apparatus of the inert gas type including a refrigerant vapor supply line, an absorber, and a liquid heat exchanger, a vapor expulsion unit [comprisinng] *comprising* an upright heating tube, a first upright conduit so connected as to contain a liquid column freely communicating through said heat exchanger with the liquid outlet of said absorber, a second upright conduit so connected as to contain a liquid column communicating freely through said heat exchanger with the liquid inlet of said absorber, one of said conduits being thermally connected to said heating tube, conduit means for conducting vapor from the upper ends of said conduits to said vapor supply line, a vapor lift pipe having the lower end thereof connected to said first conduit and the upper end thereof to said second conduit, said lift pipe having a part thermally connected to said heating tube in a zone extending downwardly below the highest point of said heat exchanger to cause expulsion of vapor from solution in said pipe and raise liquid therein by vapor lift action under the influence of a reaction head formed by the liquid column in said first conduit, and a third upright conduit connected to said first conduit below the upper end of the liquid column contained in the latter, the lower end of said lift pipe also being connected to said third conduit.

5. In an absorption refrigerating apparatus of the inert gas type including a refrigerant vapor supply line, an absorber, and a liquid heat exchanger, a vapor expulsion unit comprising an upright heating tube, a first upright conduit so connected as to contain a liquid column freely communicating through said heat exchanger with the liquid outlet of said absorber, a second upright conduit so connected as to contain a liquid column communicating freely through said heat exchanger with the liquid inlet of said absorber, one of said conduits being thermally connected to said heating tube, conduit means for conducting vapor from the upper ends of said conduits to said vapor supply line, a vapor lift pipe having the lower end thereof connected to said first conduit and the upper end thereof to said second conduit, and said lift pipe having a part thermally connected to said heating tube in a zone extending downwardly below the highest point of said heat exchanger to cause expulsion of vapor from solution in said pipe and raise liquid therein by vapor lift action under the influence of a reaction head formed by the liquid column in said first conduit, one of said conduits comprising two parallel branches.

6. In absorption refrigeration apparatus having a refrigerant vapor supply line, a circuit for circulation of absorption solution including an absorber, a vertically extending liquid heat exchanger and a vapor expulsion unit comprising an upright heating tube having a lower heat input end terminating at a level lower than the lowest point of said heat exchanger, first and second upright conduits, said first conduit being so connected in said circuit as to contain a liquid column communicating through said heat exchanger with the outlet of said absorber by an unbroken body of liquid and said second conduit being so connected as to contain a liquid column communicating through said heat exchanger with the inlet of said absorber, said heat exchanger being in the form of a coil disposed about said heating tube and constructed and arranged to vent vapor therefrom to said first and second conduits, the surface level of the liquid column in said first conduit being above the highest point of said heat exchanger, one of said conduits being in thermal relation with said heating tube, said vapor supply line being connected to receive vapor from the upper ends of said first and second conduits, and a lift pipe connected to raise liquid from said first conduit to said second conduit which includes a heat receiving and vapor forming part in thermal relation with said heating tube along a zone extending downwardly below the highest point of said heat exchanger.

7. In absorption refrigeration apparatus having a refrigerant vapor supply line, a circuit for circulation of absorption solution including an absorber, a vertically extending liquid heat exchanger and a vapor expulsion unit comprising an upright heating tube having a lower heat input end terminating at a level lower than the lowest point of said heat exchanger, first and second upright conduits, said first conduit being so connected in said circuit as to contain a liquid column communicating through said heat exchanger with the outlet of said absorber by an unbroken body of liquid and said second conduit being so connected as to contain a liquid column communicating through said heat exchanger with the inlet of said absorber, said heat exchanger being in the form of a coil disposed about said heating tube and said first conduit, the surface level of the liquid column in said first conduit being above the highest point of said heat exchanger, one of said conduits being in thermal relation with said heating tube, said vapor supply line being connected to receive vapor from the upper ends of said first and second conduits, and a lift pipe connected to raise liquid from said first conduit to said second conduit which includes a heat receiving and vapor forming part in thermal relation with said heating tube along a zone extending downwardly below the highest point of said heat exchanger.

8. In absorption refrigeration apparatus having a refrigerant vapor supply line, a circuit for circulation of absorption solution including an absorber, a vertically extending liquid heat exchanger and a vapor expulsion unit comprising an upright heating tube having a lower heat input end terminating at a level lower than the lowest point of said heat exchanger, first and second uprights conduits, said first conduit being so connected in said circuit as to contain a liquid column communicating through said heat exchanger with the outlet of said absorber by an unbroken body of liquid and said second conduit being so connected as to contain a liquid column communicating through said heat exchanger with the inlet of said absorber, the surface level of the liquid column in said first conduit being above the highest point of said heat exchanger which is in the form of a coil disposed about said heating tube, one of said conduit being in thermal relation with said heating tube, said vapor supply line being connected to receive vapor from the upper ends of said first and second conduits, and a lift pipe connected to raise liquid from said first conduit to said second conduit which includes a heat receiving and vapor forming part in thermal relation with said heating tube along a zone extending downwardly below the highest point of said heat exchanger.

9. In an absorption refrigeration system of the inert gas type including a refrigerant vapor supply line, an absorber, a liquid heat exchanger, a vapor expulsion unit comprising an upright heating tube, a first upright conduit thermally separated from said tube, a second upright conduit in thermal relation with said tube, said vapor supply line being connected to receive vapor from the upper ends of said first and second conduits, a lift pipe communicating with the lower part of said first conduit and the upper part of said second conduit, the aforesaid parts being so connected in the system that solution flows in an unbroken stream from the outlet of said absorber through said heat exchanger and first conduit into the lower end of said lift pipe and forms a liquid column in said first conduit having a liquid surface level which is above the highest point of said liquid heat exchanger, and solution entering from said lift pipe forms a liquid column in said second conduit from which solution flows through said heat exchanger to the inlet of said absorber, and said lift pipe having a part thermally connected to said heating tube in a zone extending between the liquid surface level in said first conduit and the lowest point of said heat exchanger to cause expulsion of vapor from solution in said pipe and raise liquid therein by vapor lift action under the influence of a reaction head formed by the liquid column in said first conduit.

10. In an absorption refrigeration system of the inert gas type including a refrigerant vapor supply line, an upright heating flue having a lower heat input end, a circuit for circulation of absorption solution including an absorber, a vertically extending liquid heat exchanger having its highest point intermediate the ends of said flue, and a vapor expulsion unit comprising a first upright conduit thermally separated from said flue, a first connection including said heat exchanger for conducting solution from said absorber to said first conduit at a region removed from the lower end thereof, a second upright conduit in thermal relation with said flue having its upper end communicating with said vapor supply line, a second connection including said heat exchanger for conducting solution from said second conduit to said absorber, a lift pipe which is connected at its lower and upper ends to said first and second conduits, respectively, said first connection being so formed that said first conduit contains a liquid column whose surface level is above the region solution is conducted thereto, and said lift pipe having a part in thermal relation with said flue along a zone extending downwardly below the highest point of said heat exchanger to cause expulsion of vapor from solution in said pipe and raise liquid therein by vapor lift action under the influence of a reaction head formed by the liquid column in said first conduit.

11. In an absorption refrigeration system of the inert gas type including a refrigerant vapor supply line, an upright heating flue having a lower heat input end, a circuit for circulation of absorption solution including an absorber, a liquid heat exchanger and a vapor expulsion unit comprising a first upright conduit thermally separated from said flue, a first connection including said heat exchanger for conducting solution from the outlet of said absorber to said first conduit, a second upright conduit in thermal relation with said flue, a second connection including said heat exchanger for conducting solution from said second conduit to the inlet of said absorber, said vapor supply line being connected to receive expelled vapor from said second conduit, a lift pipe which is connected at its lower and upper ends to said first and second conduits, respectively, said first connection being so formed that said first conduit contains a liquid column whose liquid surface level is above the highest point of said liquid heat exchanger and which freely communicates with the outlet of said absorber by an unbroken liquid body, and said lift pipe having a part in thermal relation with said flue along a zone extending between the liquid level in said first conduit and the lowest point of the heat exchanger to cause expulsion of vapor from solution in said pipe and raise liquid therein by vapor lift action under the influence of a reaction head formed by the liquid column in said first conduit, said liquid heat exchanger being in the form of a coil disposed about said heating flue and said first conduit.

12. In an absorption refrigeration system of the inert gas type including a [vapor] refrigerant *vapor* supply line, an upright heating flue having a lower heat input end, a circuit for circulation of absorption solution including an absorber, *a liquid heat exchanger having a plurality of passages* and a vapor expulsion unit comprising a first upright conduit in the vicinity of said flue, a first connection *including one passage of said liquid heat exchanger* for conducting solution entirely by gravity flow from the outlet of said absorber to a region of said first conduit removed from the lower end thereof, a second upright conduit in thermal relation with said flue, a second connection *including another passage of said liquid heat exchanger* for conducting solution from said second conduit to the inlet of said absorber, said vapor supply line being connected to receive vapor from said second conduit, a lift pipe which is connected at its lower and upper ends to said first and second conduits, respectively, said first connection being so formed that said first conduit contains a liquid column whose liquid surface level is above the region solution is conducted thereto, and said lift pipe having a heat receiving and vapor forming part in thermal relation with said flue along a zone extending between the liquid surface level in said first conduit and the heat input end of said flue to cause expulsion of vapor from solution in said pipe and raise liquid therein by vapor lift action under the influence of a reaction head formed by the liquid column in said first conduit, said liquid heat exchanger being in the form of a coil disposed about said heating flue and said first conduit.

*13. An absorption refrigeration system as set forth in claim 12 in which said liquid heat exchanger is in the form of a vertically extending coil disposed about said heating flue and said first conduit and the lower end of said second conduit is connected to the outer passage of said liquid heat exchanger coil at the upper end thereof.*

WILHELM GEORG KÖGEL.

(References on following page)

REFERENCES CITED

The following references are of record in the file of this patent or the original patent:

UNITED STATES PATENTS

| Number | Name | Date |
|---|---|---|
| 1,798,946 | Maiuri et al. | Mar. 31, 1931 |
| 1,802,537 | Roos | Apr. 28, 1931 |

FOREIGN PATENTS

| Number | Country | Date |
|---|---|---|
| 550,474 | Great Britain | Jan. 8, 1943 |
| 552,966 | Great Britain | May 3, 1943 |
| 557,311 | Great Britain | Nov. 15, 1943 |
| 558,338 | Great Britain | Dec. 31, 1943 |